United States Patent [19]

Bemis

[11] Patent Number: 4,703,486
[45] Date of Patent: Oct. 27, 1987

[54] COMMUNICATION DATA ENCODER/DECODER COMPONENT SYSTEM ARCHITECTURE

[75] Inventor: Gerald L. Bemis, Sunnyvale, Calif.

[73] Assignee: Advanced Micro Devices, Inc., Sunnyvale, Calif.

[21] Appl. No.: 683,281

[22] Filed: Dec. 18, 1984

[51] Int. Cl.[4] .................. H04L 1/00; G08C 25/00
[52] U.S. Cl. .......................... 371/41; 371/15; 371/22; 370/13
[58] Field of Search .............. 371/15, 30, 47, 2, 41, 371/22; 370/13, 16; 375/107, 110, 115

[56] References Cited

U.S. PATENT DOCUMENTS

| | | | |
|---|---|---|---|
| 3,469,193 | 9/1969 | Marez | 371/47 |
| 3,559,166 | 1/1971 | Schmidt | 371/30 |
| 4,047,151 | 9/1977 | Rydbeck | 371/41 |
| 4,081,790 | 3/1978 | Yamamoto | 371/8 |
| 4,317,207 | 2/1982 | Fujimura | 371/56 X |
| 4,399,531 | 8/1983 | Grande | 370/94 X |
| 4,433,415 | 2/1984 | Kojima | 371/40 X |
| 4,451,827 | 5/1984 | Kahn | 370/94 |
| 4,464,543 | 8/1984 | Kline | 340/734 |
| 4,498,173 | 2/1985 | Reudink | 371/30 |
| 4,498,176 | 2/1985 | Wagner | 371/47 |
| 4,519,070 | 5/1985 | Bell | 370/16 X |
| 4,524,445 | 6/1985 | Fujii | 371/47 |
| 4,551,834 | 11/1985 | Lienard | 371/32 X |
| 4,575,843 | 3/1986 | David | 370/16 |

*Primary Examiner*—Jerry Smith
*Assistant Examiner*—Robert W. Beausoliel
*Attorney, Agent, or Firm*—Patrick T. King; Gerald B. Rosenberg; J. Vincent Tortolano

[57] ABSTRACT

A code conversion system is described for converting a stream of data between first and second data codes. The stream of data containing data packets is recognized to be subject to a data fault condition arising from the collision of data packets. The conversion system comprises means for detecting the fault condition, and means for altering the code conversion of the stream of data between the first and second codes so as to reflect the occurrence of the fault condition in the code converted stream of data.

25 Claims, 9 Drawing Figures

4,703,486

COMMUNICATION DATA ENCODER/DECODER COMPONENT SYSTEM ARCHITECTURE

FIELD OF THE INVENTION

The present invention generally relates to a code conversion system architecture that provides for the encoding and serializing of a communications data stream for transmission and for the parallel converting and decoding of a received communications data stream appropriate for use in a local area network and, more particularly, to a code conversion circuit system architecture providing the desired data conversion, including encoding and decoding, as required to implement the corresponding major function of a local area network system communications node.

BACKGROUND OF THE INVENTION

The inter-computer communications field, exemplified by local area networks, is a rapidly expanding area of technology within the larger sphere of information processing. Local area networks provide for the interconnection of two or more computers separated by small to substantial distances ranging, typically, from several meters up to 2 kilometers.

Local area networks, however, may do more than just serve as communications links. They may act to make the resources of each participant available to all others. In ring and linear topology networks, for example, a common network media is shared between all of the computers participating in the network. The media itself is often no more than a coaxial cable or the equivalent. Each computer interfaces to the network via a communications node. While each computer may be distinctly different from any other on the network, the communications node functions to process raw data from its associated computer into a standardized format, often described as a data packet, and transmit it over the shared media. Data packets are also received by the communications node and provided to its associated computer after processing the packet to recover the raw data. Consequently, cooperative operation and the sharing of resources characterize local area networks.

The functional requirements placed on local area networks are numerous and often subject to tradeoffs depending on the particular circumstances involved in the implementation of the network. Some of the functional requirements, however, are relatively universal. While many computers may be participating in the network, only a single computer may be validly transmitting information over the network to one or more receiving computers at a time. Thus, the speed or transmission bandwidth of the network as a whole needs to be as great as possible.

Along with high speed, the network itself must be reliable. That is, first, the network must reliably provide for the transfer of data between computers without loss or distortion. Second, the network must be reliable in that, as a shared resource itself, any component failure within a communicatios node of the system should have a minimal if not undetected impact on the operation of the network as a whole.

Additionally, the cost of the network system, including the network media and the component systems forming each communication node, must be as low as possible, as a practical matter, while still obtaining the necessary speed and reliability of the local area network system.

SUMMARY OF THE INVENTION

It is therefore a purpose of the present invention to provide for the implementation of an inter-computer network communication system having all the aforementioned desired qualities.

This is attained in the present invention by providing a code conversion system for converting a stream of data between first and second data codes, the stream of data being subject to a data fault condition, the conversion system comprising means for detecting the fault condition, and means for altering the code conversion of the stream of data between the first and second codes so as to reflect the occurrence of the fault condition in the code converted stream of data.

Another purpose of the present invention is attained by providing a component of a network node wherein the component receives first and second data streams from the node and provides third and fourth data streams to the node, the component comprising means for selectably routing the first and second data streams to provide the third and fourth data streams and means for controlling the routing means to provide for the diagnostic testing of the component by selecting the routing of the first and second data streams in providing the third and fourth data streams.

Thus, an advantage of the present invention is that it directly implements the necessary facilities to provide for remote flexible component diagnostic capabilities through the provision of loop-back and bypass data stream routing.

Another advantage of the present invention is that it obtains optimal preservation of data packets by detecting and encoding the packet overlap, or smash, condition in the packet header of the overlapping data packet as it is received.

A further advantge of the present invention is that it makes optimal use of an asynchronous elastic buffer and its integral overflow/underflow condition detection capability.

Still another advantage of the present invention is that it utilizes a condition detection reporting scheme that reduces the physical interconnect required to other system component while increasing the flexibility of its component system architecture.

A still further advantage of the present invention is that the component system architecture permits close system node integration while retaining a high degree of flexibility for a variety of applications.

Yet still another advantage of the present invention is that it is adaptable to automatically performing network primitive procedures as required in the implementation of high speed local area networks.

BRIEF DESCRIPTION OF THE DRAWINGS

These and other attendant advantages of the present invention will become apparent and readily appreciated as the same becomes better understood by reference to the following detailed description when considered in connection with the accompanying drawings, in which like reference numerals designate like parts throughout the figures thereof, and wherein.

DETAILED DESCRIPTION OF THE INVENTION

I. System Overview

Figure 1:
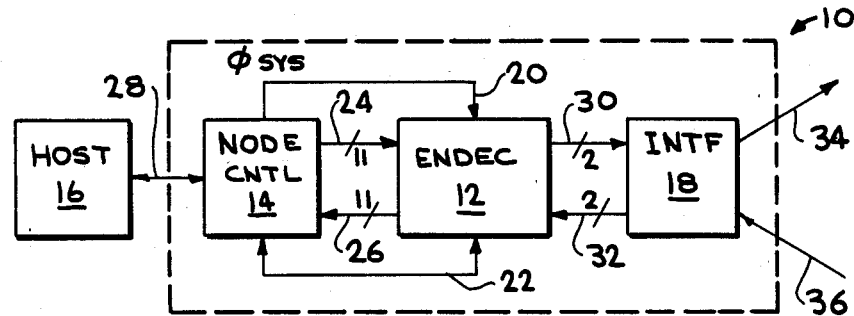
FIG. 1 is a simplified block diagram of an examplary local area network node and its associated host.

FIG. 1 illustrates the typical manner of utilizing a local area network node 10 to interconnect a host computer system 16 with a physical network media 34, 36. Typically, the node 10 will include a node controller 14, an encoder/decoder, or ENDEC, 12 and an interface unit 18 as integral system components. The host computer 16 typically communicates with the node controller 14 of the node 10 over a bidirectional data bus 28. The node controller 14, in turn, transfers data to and from the ENDEC 12 over the data busses 24, 26, respectively. In addition, the node controller 14 controls and determines the status of the ENDEC 12 by means of the control bus 22. A system clock, $\phi_{SYS}$, is provided on the clock line 20 to the ENDEC 12 to ensure that the system components are properly synchronized.

The ENDEC 12 functions to prepare the raw transmitter data provided by the node controller 14 for transmission to the interface system component 18 over the serial data bus 30 and, subsequently, onto the network media 34. The ENDEC 12 further functions to recover data received from the network media 36 via the interface system component 18 and the serial data bus 32. This recovered data is then transferred to the node controller 14 over the return data bus 26.

The interface system component 18 functions to provide a physical interconnect between the node 10 and network media 34, 36. As such, the interface 18 may simply be a coaxial "T" connector, for example. Depending on the nature of the network media 34, 36, however, the interface may perform a more complex function. Where the media 34, 36 is an optical fiber communications cable, the interface 18 also preferably includes an electro-optic transmitter and receiver.

Finally, the network media 34, 36 itself is preferably only a passive single high-speed serial data bus that physically interconnects each of the nodes 10. The topology of the network, i.e., ring, redundant loop, or linear, is thus established by how the nodes are interconnected, in terms of nearest neighbor relationships, by the physical network media.

II. Network Protocols

There are a number of somewhat different networking protocols, or systematic procedures of operation, that may be implemented to control the overall operation of the network. A design choice in the assemblage of the network is the selection of one of these protocols for implementation. One exemplary protocol, and the one preferably implemented in a network utilizing the present invention, is a token-passing, ring topology network protocol wherein communication between nodes is by means of data packets. A general description and discussion of this protocol and its principles of operation as well as other conventional protocols may be had by reference to "New Standards for Local Networks Push Upper Limits for Light Wave Data", S. Joshi et al., *Data Communications*, July 1984, pp. 127-38.

In brief, the exemplary protocol calls for the ordered access of each node to the entire network. A node having the right to access the network, i.e., the current "token" holder, may initialize a network communication sequence wherein a number of data packets are exchanged with one or more other network nodes. At the conclusion of the communication sequence, the "token" is passed to the next successive node of the network. Another communication sequence may then be initialized by the "token" holder.

Typically, the data packets are themselves only a part of a continuous data stream that traverses the network. As will be described in greater detail below, each packet includes a header portion, a data body portion, and a trailer portion. The packets may be separated from one another in the data stream by a filler code that acts to maintain status communication between all of the nodes by reflecting the line-state of the network even though no data packets are being transferred. The most primitive or basic protocol functions performed by a node include recognizing the current line-state of the network and asserting requests with respect to the line-state.

III. ENDEC Component System

1. Architecture and Data Flow Organization.

Figure 2:
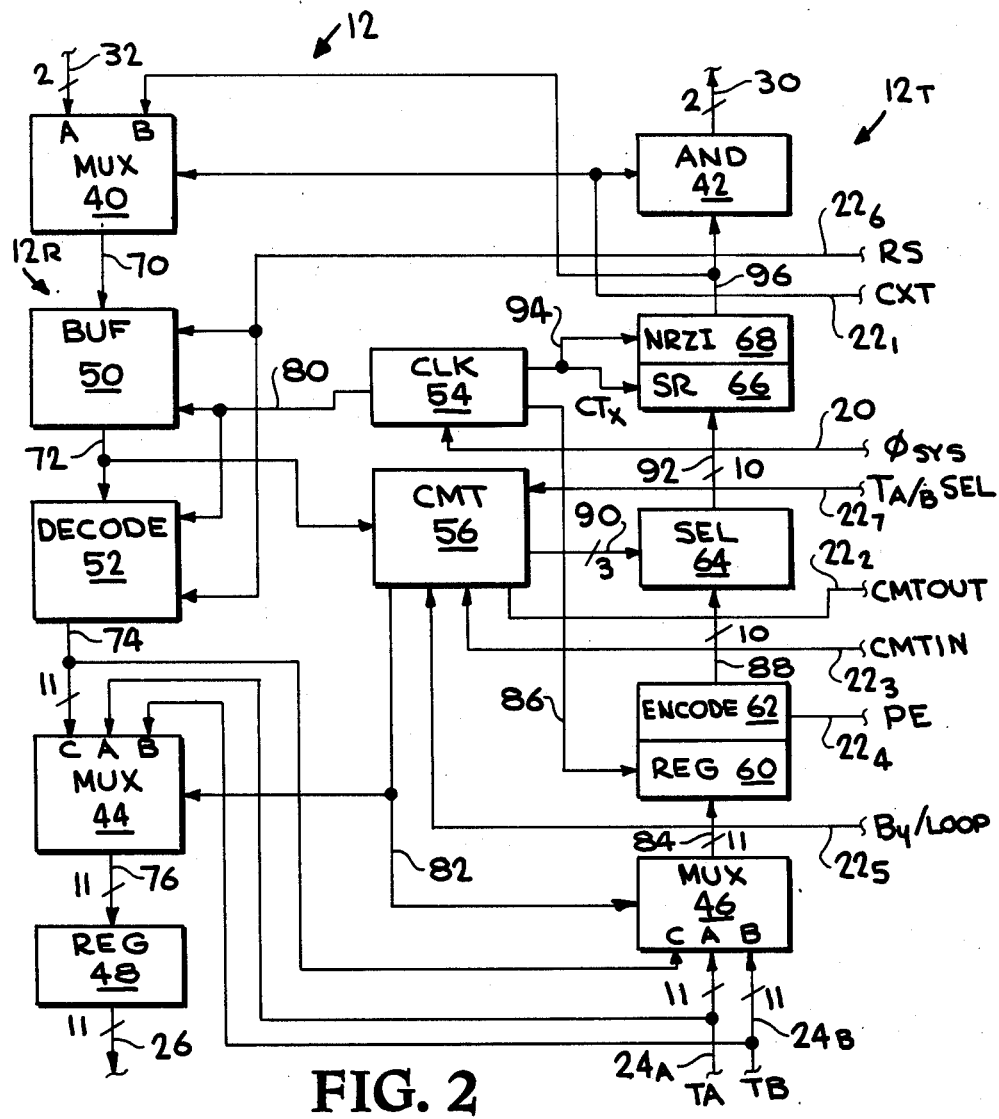
FIG. 2 is a block diagram of the principle components of an ENDEC in accordance with the preferred embodiment of the present invention.

The present invention provides an encoder/decoder component system fully capable of performing all of the required functions of an ENDEC 12 in a local area network node. Accordingly, FIG. 2 provides a block diagram of the preferred embodiment of an ENDEC 12 consistent with the present invention.

The ENDEC 12 includes two major subsections $12_T$, $12_R$. The first is a transmitter subsection $12_T$ including a multiplexer 46, register 60 and encoder 62, selector 64, serial shift register 66, non-return-to-zero invert-on-ones (NRZI) converter 68, and an AND gate 42. The receiver subsection $12_R$ includes a multiplexer 40, buffer 50, decoder 52, multiplexer 44, and register 48. These two subsections are jointly controlled by a command management (CMT) unit 56 and a clock unit 54.

In greater detail, the ENDEC 12 may receive two separate parallel data streams, $T_A$, $T_B$, over the respective transmitter input lines $24_A$, $24_B$. This parallel data, as provided by the node controller 14, preferably includes a single data byte, high and low order nibble control/data bits, and a parity bit. The multiplexer 46 receives the two transmitter parallel data streams on its A and B inputs, and, further, an equivalently formatted received data word stream on the multiplexer 46 C input as provided by the receiver subsection via bus 74. The selection of one of the three input parallel data streams is in response to control signals provided on control lines 82 by the CMT 56. The selected data is transferred by the multiplexer 46 over the parallel data bus 84 to the register 60 where it is latched in response to a clock signal provided by the clock unit 54 on line 86. Each parallel data word is thus sequentially provided via the register 60 to the encoder circuit 62 for encoding.

In accordance with the preferred embodiment of the present invention, the encoder 62 implements a 4B/5B encoding scheme wherein each high and low order nibble of the data byte is encoded in combination with its respective control/data bit to provide 2 five-bit code symbols. Table I sets forth each unencoded data nibble, as well as its preferred corresponding encoded bit group and code symbol assignment. Preferably each data packet header includes a JK code symbol pair as a start delimiter followed by a data body of data code symbols, further followed by a trailer beginning with a terminator code symbol and, optionally, a following control symbol. The filler portion of the data stream between data packets is itself simply a sequence of line-state symbols that approximately indicate the current status of the network medium.

TABLE I

| Symbol Group | Control Data Bit | Data Nibble (Hex) | Encoded Bit Group | Symbol | Assignment |
|---|---|---|---|---|---|
| Line-State Indicators | 1 | 0 | 00000 | Q | Quiet |
| | 1 | 7 | 11111 | I | Idle |
| | 1 | 4 | 00100 | H | Halt |
| Starting Delimiters | 1 | C | 11000 | J | Start of packet header |
| | 1 | 3 | 10001 | K | |
| Data Symbols | 0 | 0 | 11110 | 0 | |
| | 0 | 1 | 01001 | 1 | |
| | 0 | 2 | 10100 | 2 | |
| | 0 | 3 | 10101 | 3 | |
| | 0 | 4 | 01010 | 4 | |
| | 0 | 5 | 01011 | 5 | |
| | 0 | 6 | 01110 | 6 | |
| | 0 | 7 | 01111 | 7 | |
| | 0 | 8 | 10010 | 8 | |
| | 0 | 9 | 10011 | 9 | |
| | 0 | A | 10110 | A | |
| | 0 | B | 10111 | B | |
| | 0 | C | 11010 | C | |
| | 0 | D | 11011 | D | |
| | 0 | E | 11100 | E | |
| | 0 | F | 11101 | F | |
| Ending Delimiter | 1 | D | 01101 | T | Termination |
| Control Indicators | 1 | 1 | 00111 | R | Reset |
| | 1 | 9 | 11001 | S | Set |
| Physical | 1 | F | | Phy-I | Physical |
| Error | 1 | E | | J.Phy-I | Invalid Smash JK |
| Misc. Group Symbols | 1 | 2 | | X | Not defined; treat as halt. |
| | 1 | 5 | | H | Improperly transmitted; treat as halt. |
| | 1 | 6 | | X | Not defined; treat as halt. |
| | 1 | 8 | | V | Violation |
| | 1 | A | | H | Improperly transmitted; treat as halt. |
| | 1 | B | | H | Improperly transmitted; treat as halt. |

The encoder 62, in the process of encoding each data byte also regenertes a parity bit that is then compared to the parity bit supplied with the original parallel data word to determine whether an error has occurred in the transfer of the parallel word from at least the node controller node 14 to the ENDEC 12. The parity error, if present, is reported back to the node controller 14 over the control bus line 22₄.

The encoded data is passed via the encoded data word bus 88 to a selector circuit 34 where, nominally, it is further passed via the parallel bus 92 to the serial shift register 66. As will be described in greater detail below, the CMT unit 56 may direct, via selector control lines 90 that the selector 64 generate and select line-state and, possibly, error code symbols for subsequent transmission. In any case, the code symbols received by the serial shift register 66 are parallel-to-serial converted in response to a transmitter clock signal CTx provided by the clock unit 54 over clock line 94. The serialized data provided by the serial shift register 66 is further converted by a conventional non-return-to-zero invert-on-ones (NRZI) converter 68 to the corresponding preferred serial format. The resulting NRZI data is then provided to the AND gate 42 via the serial data line 96. The serial data stream is preferably further converted to a conventional differential signal by the AND gate 42 and provided on the serial data line pair 30 to the interface system component 18 for transmission.

The receiver subsection $12_R$ of the ENDEC 12 selectably receives serial data streams from the interface system component 18 over a differential signal serial data line pair 32 and from the transmitter subsection $12_T$ over line 96. The multiplexer 40 preferably includes a conventional differential signal receiver for converting the input serial data stream received from the interface 18 into a standard non-differential signal. The multiplexer 40, as directly controlled by the node controller 14 via the connection control bus line 22₁, selects between its two available input data streams and provides the selected received serial data stream to the buffer 50 over the serial data line 70.

The buffer 50 is preferably of a type generally known as an elastic buffer. Such buffers typically include a buffer memory and provide for the asynchronous reading and writing of data contained therein. Thus, variations in the rates at which data is received written into the buffer and subsequently read out may be tolerated.

The buffer 50 preferbly also includes a phase-lock loop and data separator circuit to reconstruct separately the data and a received data clock signal CRx from the received NRZI data stream. The received data clock signal CRx corresponds to the transmitter clock signal of the node 10 transmitting the data currently being received, and is used to synchronize the writing of received data into the buffer memory of the buffer 50. The buffer 50 also receives the transmitter clock signal CTx from the clock unit 54 over line 80 to synchronize the reading of data from the buffer 50 with the remainder of the receiver subsection of the ENDEC 12.

The received data, as it is read from the buffer 50, is provided to the decode unit 52 over the serial data line 72. As will be discussed in greater detail below, this serial data is also passed to the CMT unit 56 for monitoring of the current line-state. The decode unit 52, synchronous with the data read from the buffer 50, reconstructs parallel encoded data words from the serial data stream. The decode unit 50 then sequentially decodes each of them to provide a stream of decoded 11-bit-wide parallel data words on the parallel received data bus 74.

The parallel decoded data stream is in turn provided to the multiplexer 44 as one input thereto. Two additional parallel data word inputs to the multiplexer 44 are obtained from the two transmitter lines 24$_A$, 24$_B$, respectively. The multiplexer 44 is controlled by the CMT unit 56 to select between its three inputs. The selected received data word stream is provided by the multiplexer 44 on the parallel data bus 46 to the register 48 where it is buffered prior to transfer to the node controller 14 via the parallel receive data bus 26.

The CMT unit 56 of the ENDEC 12 is itself directly controlled by the node controller 14 via the CMTIN lines 22$_3$, the bypass/loop control lines 22$_5$ and the transmitter A/B source select line 22$_7$. The CMTIN control lines 22$_3$ permit the node controller 14 to specify to the CMT unit 56 that it is to operate the selector 64 of the ENDEC 12 so as to implement specific primitive local area network protocols to establish the node 10 as, for example, a peer, master or slave unit. The status of the CMT unit 56, as well as the line-state of the network as perceived by the CMT unit 56, is reported back to the node controller 14 via the CMTOUT lines 22$_2$. The CMTIN control lines 22$_3$ also permit the node controller 14 to functionally disable the CMT unit 56 so that no primitive protocols are implemented. The nature and purpose of the preferred primitive protocols, as well as the operation of the CMT unit 56, will be described in greater detail below.

The bypass/loop control lines 22$_5$, transmitter A/B source select line 22$_7$ and the connector control line 22$_1$ together permit the node controller 14 to select the data stream paths through both the transmit and receive subsections 12$_T$, 12$_R$ of the ENDEC 12. Significantly, this allows the node controller 14 to configure the data paths through the ENDEC 12 to implement a high degree of self-diagnostic capabilities within the node 10. That is, the node controller 14 may bypass the majority of the ENDEC 12 by routing a transmitter parallel data stream from either of the transmitter input lines 24$_A$, 24$_B$ through the multiplexer 44 and register 48 directly back to the node controller 14, thereby allowing direct testing of the parallel data path between the node controller 14 and the ENDEC 12. Substantiallyl all of the internal circuitry of the ENDEC 12 may also be tested by the node controller 14 by appropriately selecting a loop-back path from the output of the NRZI unit 68 to the multiplexer 40 via the serial data line 96 and back through essentially the entire receive subsection of the ENDEC 12.

Further, the node controller 14 may elect to allow another node of the local area network to evaluate the operation of the ENDEC 12 and all the intervening components of the network. That is, the node controller 14 may select via the bypass loop-back control lines 22$_5$ to configure the multiplexer 46 to select the decoded receive parallel data from the decode unit 52 to be passed by the multiplexer 46 as the parallel data to be encoded, serialized and subsequently retransmitted onto the network media. In this manner, large sections of the network can be evaluated so as to determine those elements that, for example, contribute to the progressive degradation of data as it's passed through the corresonding section of the network.

2. Buffer and Decode Section Detail

Figure 3:
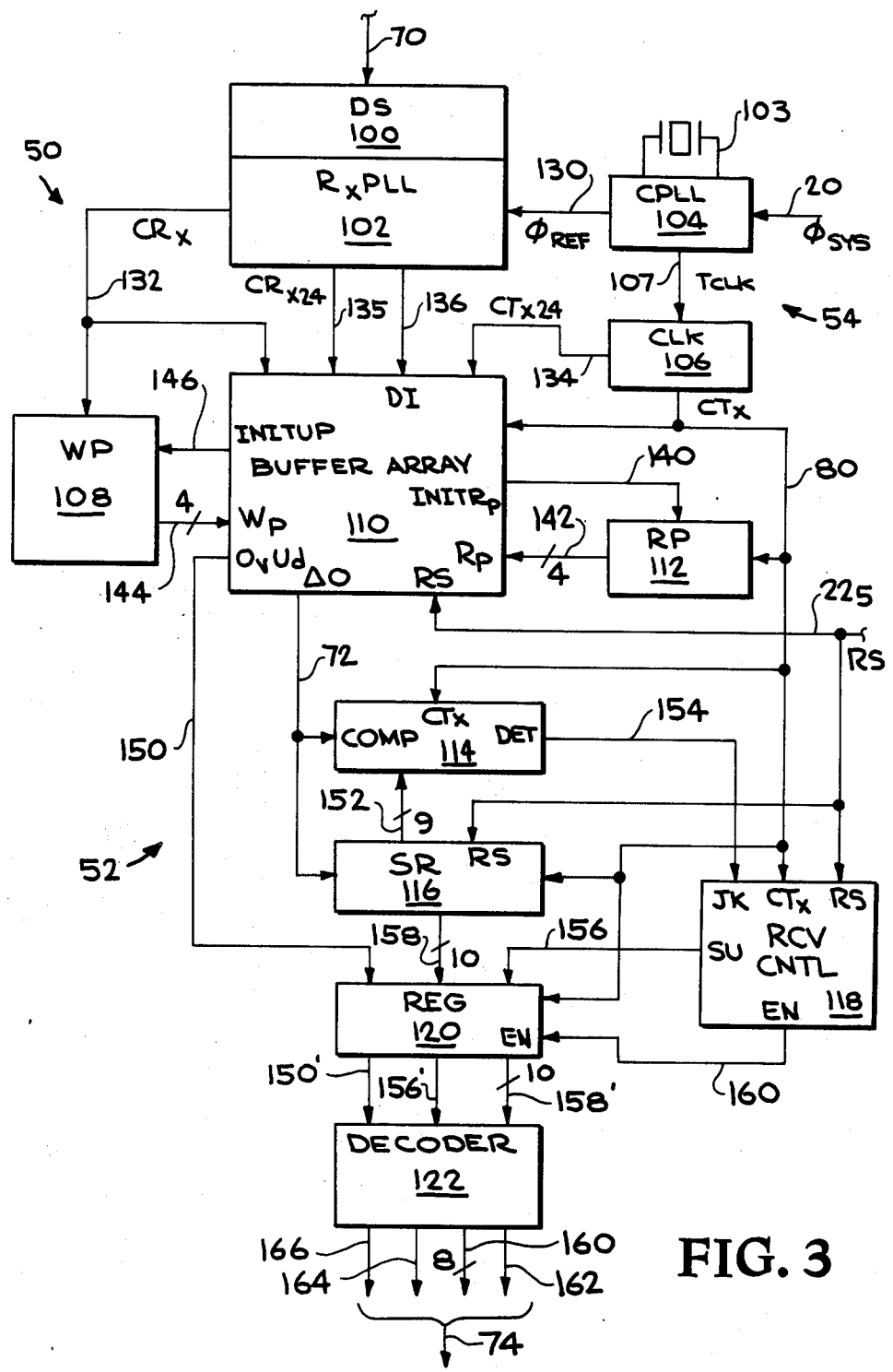
FIG. 3 is a block diagram of the preferred buffer and decoder components of FIG. 2.

Referring now to FIG. 3, the preferred implementation of the buffer 50 and decode unit 52 are shown. In accordance with the preferred embodiment of the present invention, the serial received data stream provided on line 70 by the multiplexer 40 is a non-differential serial signal containing non-return-to-zero invert-on-ones encoded data. Thus, to recover the data from the serial data stream provided, a conventional data separator 100 and receiver phase-lock loop 102 are employed. A reference frequency, $\emptyset_{REF}$, is provided by the clock unit 54 phase-lock loop 104. Based on this reference frequency, the data separator 100 and receive phase-lock loop 102 locks onto and regenerates separately the received data clock signal CRx and the encoded serial data stream on lines 132 and 136, respectively.

As generally indicated above, the data stream containing data packets may be received by the ENDEC 12 at a rate that differs by a small but significant amount from the transmit clock signal CTx as directly derived from the system clock $\emptyset_{SYS}$ signal. In the present invention, a serial data stream buffering and resynchronization function is accomplished through the use of a dual ported asynchronous or elastic buffer. Preferably, the elastic buffer includes a linear memory array within a buffer array 110 with separate write and read counter/pointers 108, 112. The asynchronous reading and writing of data to the linear memory array of the buffer array 110 is accomplished by utilizing the write counter/pointer 108, synchronous with the CRx signal, to sequentially point to the next available memory cell of the linear memory array. This permits serial data bits to be written to the buffer array at the rate they are received. The read counter/pointer 112 also sequentially points to memory cells of the linear memory array to allow the CTx signal synchronous reading of buffered serial data bits. Thus, the reading of serial data from the buffer 50 is synchronous with respect to the operation of the decode unit 52 and the node controller 14.

The length of the linear memory array of the buffer array 110 is effectively made infinite by specifying that the counters of both the write pointer 102 and read pointer 112 are reset to zero as they are respectively clocked past ponting at the last memory cell of the buffer array. However, where there is too great a disparity in the rates of reading and writing data from and to the buffer array 110, an overflow/underflow condition occurs. That is, both the write pointer 102 and read pointer 112 effectively pont to the same memory cell of the buffer array 110 resulting in a compromise of data integrity. While the particularly preferred manner of detecting the imminent occurrence of the overflow/undeflow condition will be described below, it is sufficient for purposes of the present invention merely that the elastic buffer 108, 110, 112 detects this condition and provides an appropriate overflow/underflow (OvUd) signal on line 150 to the decoder 52.

The serial data stream, as synchronized by the buffer array 110 to the ENDEC transmitter clock signal CTx, is provided over line 72 to the decode unit 52. Preferably, the decode unit 52 includes a comparator 114, serial-to-parallel shift register 116, a receiver control unit 118, a register 120, and, finally, a decoder 122. In greater detail, the serial data stream including data packets is serially clocked from the buffer array 110 into the shift register 116 in response to the transmitter clock signal CTx pulses provided on line 80. As the encoded data words of the data stream are ten bits long in accordance with the preferred embodiment of the present invention, the shift register 115 is correspondingly ten bits wide. The comparator 114 has, as one input thereto, the single data bit present on the serial data line 72 during each cycle of the transmitter clock signal CTx. The nine low-order bits simultaneously present in the shift register 116 are also provided to the comparator 114 by the partial parallel shift register output comparator input bus 152. thus, the comparator 114 samples a full ten-bit-wide data word during each transmitter clock cycle, one clock cycle prior to the equivalent word being fully shifted into the shift register 116. The comparator 114 thus preferably compares the encoded potential data word presented to it with the code equivalent of the start delimiter JK code symbol pair. Detection of the JK symbol code pair by the compartor 114 is significant in that it signals the imminent presence of a known data word properly aligned in the shift register 116. Upon detecting a JK code symbol pair, the comparator 114 provides a detect signal over line 154 to the receiver control unit 118.

The receiver control unit 118 itself preferably includes a bit counter whose capacity corresponds to the bit length of the encoded data words and counts in response to each cycle of the transmitter clock signals CTx, as provided on line 80. Reception of the JK detect signal from the comparator 114 causes the receive control unit 118 to reinitialize its bit counter and to issue a latch-enable signal to the register 120 over line 160 during the next transmitter clock cycle. This has the desired effect of latching the properly aligned full ten-bit-wide data word present in the shift register 116 as provided over the parallel data bus 158, into register 120. Subsequent serial data words are partitioned in alignment with their preceding JK code symbol data word by the receiver control unit 118. That is, the bit counter of the receive control unit 118 cycles to its full capacity count as each data word is serially shifted into the shift register 116 and into alignment with its preceding JK code symbol pair. The bit counter then preferably self-resets and causes the receive control unit 118 to issue its latch enable signal on line 160. Thus, the serial data stream is successively partitioned into encoded parallel data words and successively passed to the register 120 and the decoder 122.

A error condition particular to local area networks arises when data packets are transmitted onto the network such that they overlap one another. This condition is generally referred to as a collision or smash condition. In accordance with the present invention, a potential smash condition is detected by the receiver control unit 118 whenever a JK code symbol pair detect signal is received from the comparator 114 yet the bit counter of the receive control unit 118 is not at its capacity count. This indicates that the currently detected JK code symbol pair is out of alignment with the Jk code symbol pair last previously processed through the decode unit 52. In response, the receive control unit 118 issues a smash condition detected signal over line 156 to the register 120, reinitializes its bit counter to adjust the partioning of data words into alignment with the presently detected JK code symbol pair and enables register 120 to latch in the smash condition as a separate bit in the register 120 along with the JK code symbol pair. The state of the overflow/underflow (OvUd) signal, as provided on line 150, is also latched into the register 120 as a further parallel bit therein.

The register 120 provides its latched data word of code, data or line-state symbols to the decode 122 by way of the parallel data word bus 158'. Similarly, the overflow/underflow and smash condition error bits are passed to the decoder 122 over the bit lines 150', 156', respectively.

The decoder 122, in turn, decodes its inputs, preferably in accordance with Table I. That is, the high and low order five bits of the encoded data word are decoded to their respective unencoded binary nibbles and provided on the parallel data bus 160. Their respective decoded control/data indicators are provided on their respective high and low order control/data bit lines 164, 166. Finally, the decoder 122 further generates a parity bit corresponding to the value of the decoded data byte and provides it on the parity bit line 162. Consequently, the desired parallel data stream is reconstructed by the decoder 122 and provided on the parallel received data bus 74 and, as earlier noted, provided to the multiplexer 44, as shown in FIG. 2.

The decoder 122 advantageously further functions to ultimately provide the node controller 14 with an direct indication of the occurrence of both the overflow/underflow and smash error conditions. That is, the decoder 122 alters the otherwise normal decoding of the encoded data word provided on parallel data bus 158' whenever an error data bit is provided on the error bit lines 150', 156'. In particular, the decoder 122 effectively abandons the decoding of the encoded data word whenever the overflow/underflow error bit is present. Instead the decoder 122 effectively decodes a pair of physical-invalid error symbols and provides the corresponding parallel decoded data word on the parallel data bus 74. That is, the decoder 132 provides high and low order nibbles "F", "F" hex with both control/data bits=1, thus indicating that the integrity of the data in the current data packet has been compromised and should be ultimately abandoned by the node controller 14.

Similarly, the decoder 122 alters its decoding of the encoded JK code symbol pair when the smash condition bit is provided on the error bit line 156'. Instead of decoding the JK code symbol pair ot the binary high and low order nibbles "C" and "3" hex with both control/data bits=1, the decoder 122 preferably decodes the smash JK or J physical-invalid condition as high and low order nibbles "E" and "3" hex with both control/data bits=1. Consequently, the decoded data word ultimately provides the node controller 14 with the specific information that both a smash condition has occurred and a new data packet is now being received. This is significant in that it allows the node controller to effectively abandon the overlapped and, therefeore, incomplete data packet while being properly informed that a new and potentially error-free data packet is being transferred from the ENDEC 12. Further significantly, the effective encoding of the smash condition into the otherwise decoded JK code symbol pair equivalent relieves the need to provide an additional physical interconnect control line between the ENDEC 12 and the node controller 14, thus simplifying the physical interface between the two system components without loss of function or flexibility.

2.a. Preferred Elastic Buffer Design

Figure 4:
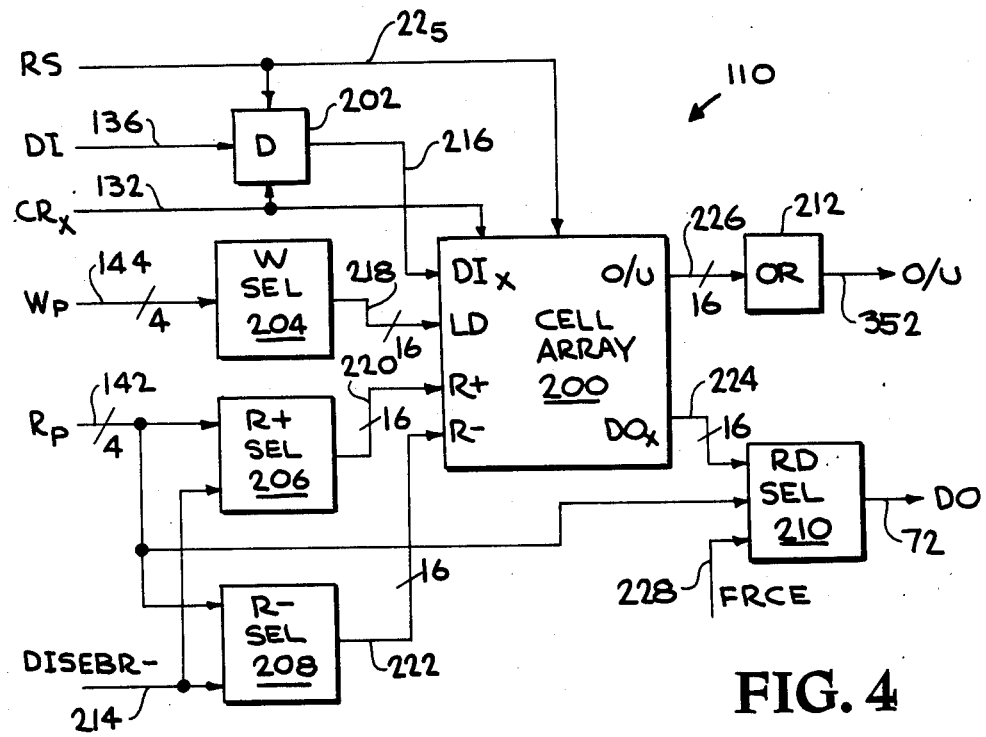
FIG. 4 is a block diagram of the preferred buffer element of FIG. 3.

As noted above, a conventional elastic buffer may be utilized to perform the functions of the write pointer 108, buffer array 110, and read pointer 112. However, the preferred design of the elastic buffer 108, 110, 112 is detailed in FIGS. 4-7. In particular, the principal elements of the buffer array 110 are shown in FIG. 4. The cell array 220 of the buffer array 110 is preferably a linear array of separately addressable cell units $200_n$, an exemplary one being shown in FIG. 5. The cell array 200 is analogous to a first-in, first-out (FIFO) memory except that it is asynchronously read and written as permitted by the control circuitry associated with the buffer array 110 and shown in FIGS. 6–7.

For the preferred embodiment of the present invention, the cell array 200 preeferably has a minimum length sufficient to progressively buffer an entire data packet that is simultaneously written to and read from the cell array 200 while tolerating the greatest disparity acceptable between the serial data stream receive and transmit clock rates CRx, CTx. Thus, for an exemplary data packet consisting of 9,000 code symbols (or 45,000 serial bits in length), a transmitter clock signal (CTx) base frequency of 125 mhz with a tolerance value specified at ±0.005 percent and, therefore, a maximum CTx to CRx frequency variance of 0.01 percent, the cell array 200 must provide for an elasticity of ±4.5 serial data bits minimum. In practical terms, this translates into an elastic buffer cell array 200 having a minimum of ten cell units $200_n$ to permit the buffering of an entire data packet without the possibility of incurring a data overflow/underflow error condition. However, for reasons that will become apparent below, the preferred cell unit length of the cell array 200 is 16.

Figure 7:
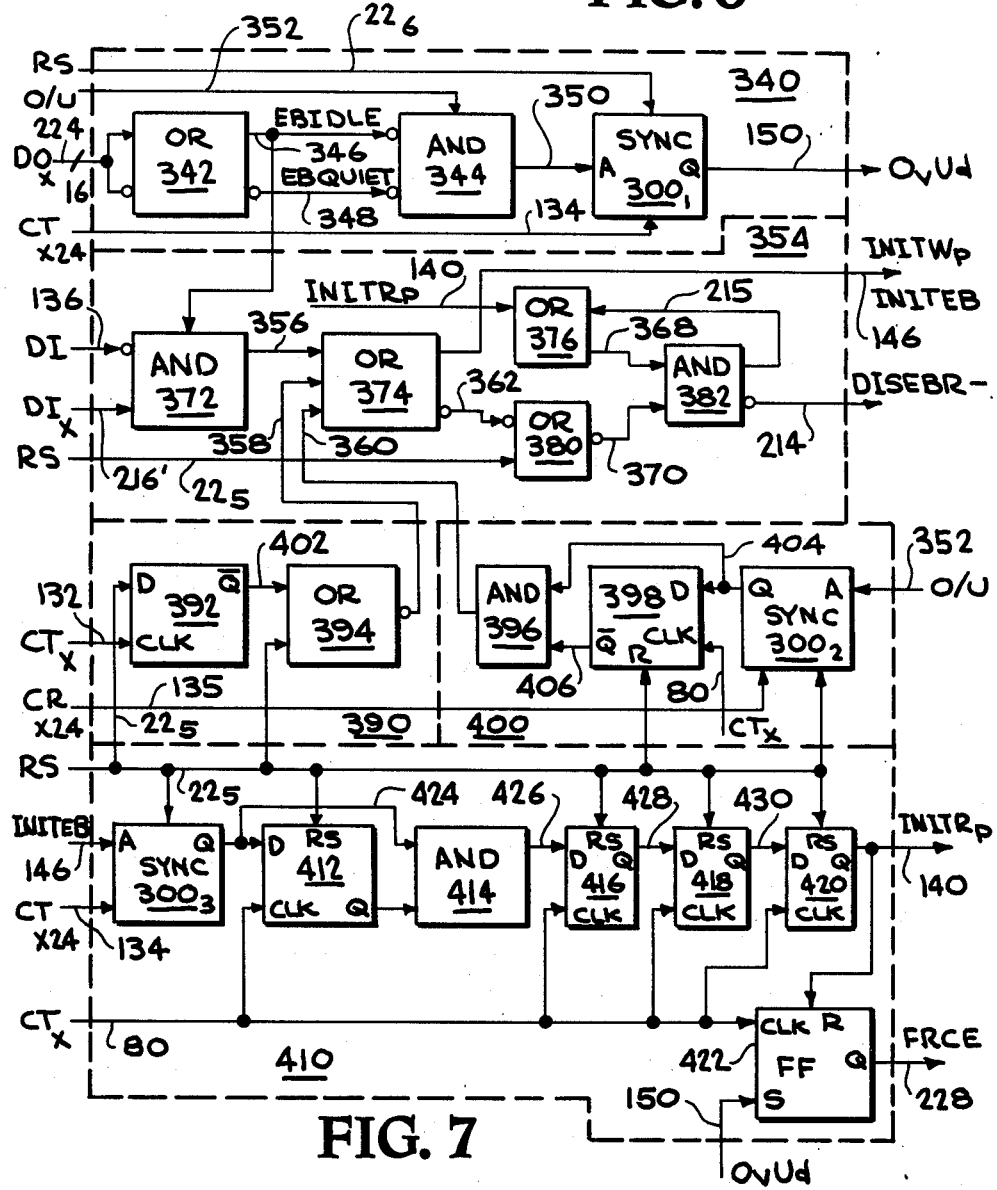
FIG. 7 is a detailed block diagram of the control circuitry utilized in the implementation of the buffer element of the preferred embodiment of the present invention.

In operation, the write pointer 108 of FIG. 3 is initialized by an INITWp signal provided by the control circuitry of FIG. 7 on control line 146. The binary counter of the writer pointer 108 is accordingly reset. As serial data is received by the buffer array 110 on the DI line 136, the binary counter of the write pointer 108 sequentially increments the write pointer count provided to the buffer array 110 via the pointer lines 144. That is, the count of the write pointer 108 is incremented with each cycle of the receive clock signnal CRx as provided on the line 142 and is, therefore, synchronous with the provision of the serial data to the buffer array 110 on the DI line 136.

Figure 5:
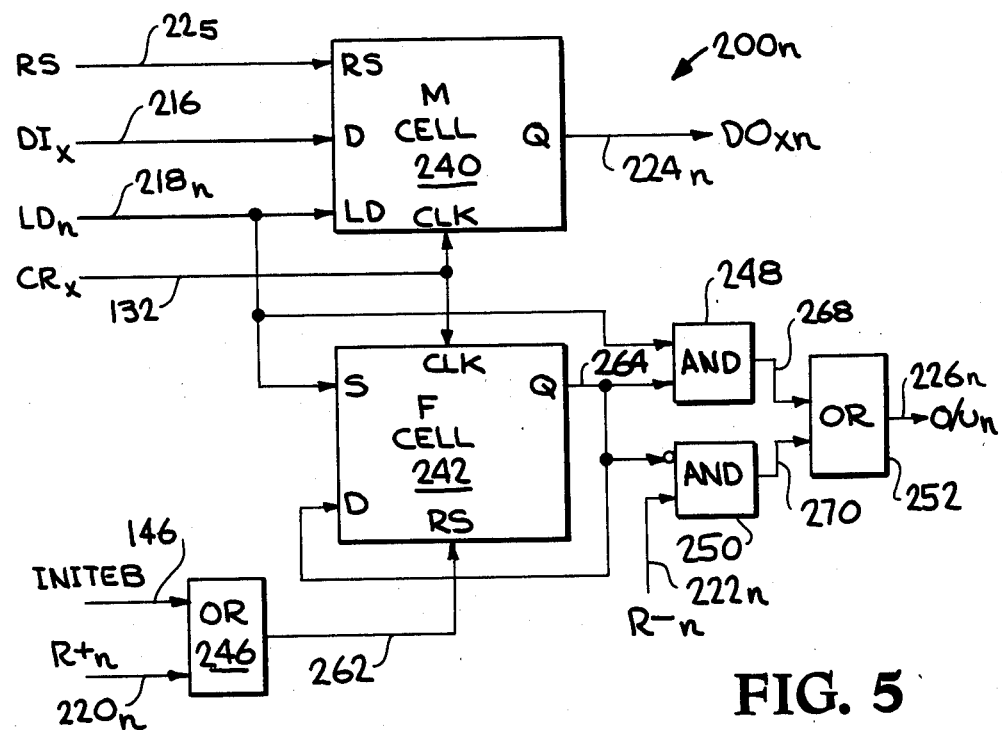
FIG. 5 is a block diagram of the preferred memory element of the buffer element of FIG. 4.

Referring again to FIG. 4, the writer pointer count is provided via the write count lines 144 to the write cell unit selector 204. Preferably, this selector 204 is a binary 4- to 16-line decoder with each of its 16 output lines 218 connected to a respective cell unit $200_n$. As shown in FIG. 5, each of these lines $218_n$ is connected to a memory cell 240 within their respective cell units $200_n$ to provide a data load enable signal. Serial data from the DI line 136 is buffered, preferably by a D flip-flop 45 clocked from the CRx clock line 132, and provided in common on a DIx line 216 to each memory cell 240 of the respective cell units $200_n$. Thus, as a cell unit $200_n$ is selected by an appropriate signal on their load select line $218_n$, the corresponding memory cell 240 loads the serial data bit, as present on the DIx line 216, into the memory cell 240 synchronous with the receive clock signal CRx as provided on the line 132. The single data bit stored in the memory cell $240_n$ is thus made available on its respective output line $DOx_n$ $224_n$.

Considering again FIG. 3, the buffer array 110 and the read pointer 112 operate similarly to provide for the reading of data from the cell array 200. The binary counter of the read pointer 112 is at least initially reset in response to the INITRp signal provided on the control line 140 by the control circuitry of FIG. 7. Subsequently, the binary count increments in response to the transmitter clock signal CTx as provided on the clock line 80. Again referring to FIG. 4, the binary read pointer count is provided to the buffer array 110 on the read count lines 142. In particular, the read count is provided to the read cell unit selector 210, preferably including a conventional 16-to-1 multiplexer circuit.

The respective $DOx_n$ lines $224_n$ from the memory cells $240_n$ are provided as the respective data inputs to the read selector 210. Thus, the data of one memory cell 240 is selected in response to the read pointer count and is transferred to the data-out (DO) line 72.

2.b. Overflow/Underflow Detection

Referring again to FIG. 5, detection of overflow/underflow conditions during the operation of the buffer array 110 is accomplished through the use of a flag cell 242 provided in each respective cell unit $200_n$. Similar to the memory cell 240, the flag cell 242 is capable of storing a single bit of information. However, the particular information stored relates to whether a read or write operation was the last such operation performed with regard to its respective memory cell 240.

For a given unit cell $200_n$, selection of the memory cell 240 by the write select circuit 204 provides a load signal on its corresponding load signal line $218_n$. This load signal is also applied to the data set input of the flag cell 242. Thusl, as the memory cell 240 is written with data from the DIx line 216 by a transition of the receive clock signal CRx on the line 132, the flag cell 242 is simultaneously set. The output of the flag cell 242 on output line 264 is fed back to the data input of the flag cell 242 thereby maintaining the current state of the information stored in the flag cell through subsequent transitions of the receive clock signal CRx.

A write overflow condition will arise whenever the memory cell 240 of a cell unit $200_n$ is written to when its corresponding flag cell 242 is already set. This combination of conditions is detected by the AND circuit 248 taking as its inputs the load signal provided on the line $218_n$ and the output of the flag cell 242 as provided on its output line 264. The resulting signal is provided on the AND 248 output line 268 to the OR gate 252 and immediately to the overflow/underflow ($O/U_n$) line $226_n$ of the cell unit $200_n$. As shown in FIG. 4, the $O/U_n$ signals provided by the cell units $200_n$ on their respective lines 226 are ORed together by the OR gate 212. Thus, should any one of the cell units $200_n$ detect a write cell array overflow condition, a corresponding overflow/underflow condition signal (O/U) will be provided on the cell array overflow/underflow line 352. This signal is, in turn, provided to the control circuitry of FIG. 7 that ultimately determines whether an overflow/underflow condition detection (OvUd) signal will be issued by the buffer array 110.

A read underflow condition is detected in a similar manner. Referring first to FIG. 4, the read pointer count as provided on lines 142 is provided to a read+ selector 206 and read- selector 208 in addition to the read cell unit selector 210. The read+ selector 206 and read-selector 208 both also preferably include 4- to 16-line decoder circuits. The three read selectors, however, are distinguished in that for a given read pointer count, the selectors 206, 208, 210 will select three consecutive cell units $200_n$ of the cell array 200. In particular, the read-selector selector 208 will select, by way of one of its output lines $222_n$ the cell unit $200_n$ that will be selected by the read selector 210 upon the next increment of the read pointer count. The read+ selector 206 similarly selects, by way of one of its output lines 220 the cell unit $200_n$ selected by the read selector 210 in response to the immediately preceding read pointer count.

Referring again to FIG. 5, selection of the cell unit $200_n$ by a signal on the $R-_n$ select line $222_n$ effectively tests the status of the flag cell 242 of the cell unit $200_n$ preceding the one currently being read as selected by the read selector 210. That is, application of the R−$_n$ select signal to the AND gate 250, having the output of the flag cell 242 via the output line 264 as its other input, results in the transfer of the complemented current status 226$_n$ of the cell unit 200$_n$ via the line 270 and the OR gate 252. If the output of the flag cell 242 is set indicating that a write operation was last performed on its associated memory cell 240, then no cell unit overflow/underflow (O/U$_n$) signal is provided on O/U$_n$ line 226$_n$. However, should the output of the flag cell 242 be reset, AND gate 250 and OR gate 252 will act to provide a cell unit overflow/underflow signal on line 226$_n$ and, ultimately, on the cell array overflow/underflow line 352. Consequently, it is the status of the flag cell 242 of the cell unit 200$_n$ that is next to be read that determines whether an overflow/underflow condition is considered to exist.

The read+ selector 206, in contrast, adjusts the status of the flag cell 242 of the cell unit 200$_n$ last previously read. The R+$_n$ select signal from the read+ selector 206 provided on the line 220$_n$ is gated by the OR gate 246 over line 262 and applied to the status reset input of the flag cell 242 as the memory cell 240 of the next cell unit 200$_n$ is read. Consequently, a write operation directed to a cell unit 200$_n$ prior to the completion of a read operation on the next cell unit 200$_n$ in the linear array 200 will result in the effective detection of an overflow/underflow condition. Thus, in accordance with the preferred embodiment of the present invention, an overflow/underflow condition is stipulated to occur whenever read and write operations occur near simultaneously on adjacent cell units 200$_n$ of the cell array 200.

Accordingly, the minimum number of cell units in the cell array 200 must be increased by two over the number previously determined to be required. In the example above for the case of the preferred embodiment, the minimum number becomes twelve. However, for simplicity of construction in view of the use of 4-bit write and read pointer counters, the preferred number of cell units 200$_n$ is sixteen.

A significant virtue of the preferred overflow/underflow detection scheme described above is that it avoids metastable logic state conditions. That is, in conventional elastic buffers, an overflow/underflow condition may not be detected until the same cell unit is addressed for both reading and writing. There are, however, finite propagation and settling times associated with signals in all electronic circuits. Until all relevant signals have propagated and settled, the combinatorial output of logic gates affected may not properly reflect the input conditions of the circuit. Relevant to the function of an elastic buffer, metastable states may result in the reading and writing of incorrect data as well as the improper detection or failure to detect overflow/underflow conditions. This metastable state problem is completely avoided through the use of the preferred embodiment of the present invention by stipulating the detection of an overflow/underflow condition prior to its actual occurrence.

2.c. Elastic Buffer Control Circuitry

Figure 6:
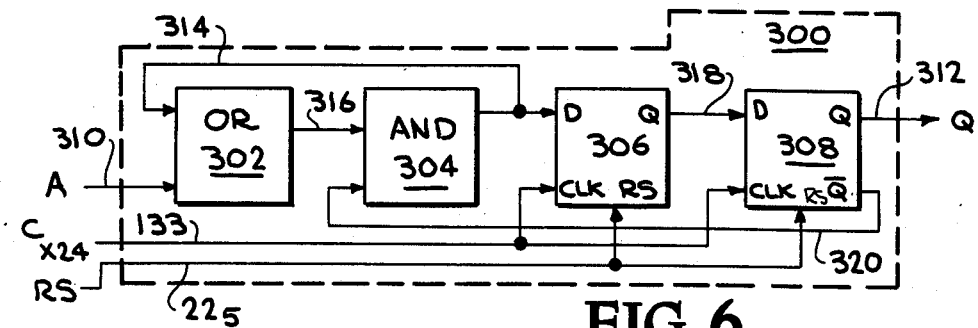
FIG. 6 is a block diagram of a data synchronizer utilized in the preferred embodiment of the present invention.

Metastable states are of concern whenever a logic circuit must deal with asynchronous event inputs. The control circuitry, as shown in FIG. 7, must deal with the asynchronous occurrence of the cell array overflow/underflow signal as provided on line 352 of FIG. 4, as well as a normal operating condition that causes the initialization of the cell array 200 and the provision of a reset signal on line 22$_5$ by the node controller 14. Consequently, the synchronization circuit shown in FIG. 6 is utilized in the control circuit of FIG. 7 to prevent the propagation of metastable states and resulting improper circuit operation. The synchronization circuit 300 of FIG. 6 utilizes OR gate 302 and AND gate 304 to latch an input signal provided on the A input line 310. Considering an initial state where no input signal is provided on the input line 310 and the a logic zero is present on the feedback line 314 that connects the output of the AND gate 304 to an input of the OR gate 302, a logic zero will be present on the OR-AND 302, 304 interconnecting line 316 resulting in a stable logic condition with respect to the OR and AND gates 302, 304. An extended clock signal Cx$_{24}$ is provided on line 133 as the clock input to two series connected D flip-flops 306, 308. For purposes of the present invention, this extended clock signal Cx$_{24}$ perferably has a period three times longer yet otherwise synchronous with the clock signal CTx, CRx from which it is derived. The output of the AND gate 304 is provided as the input to the D flip-flops 306 that, in turn, provides its output on line 318 to the input of the second D flip-flop 308. At least initially, the data content of the two flip-flops 306, 308 are logic zeros resulting in the feedback of a logic one signal on line 320 from the complement output second D flip-flop 308 to an input of the AND gate 304.

Transition of the input signal on line 310 from a logic zero to a logic one results in the latching of the logic one as between the OR gate 302 and AND gate 304 at least until the logic state of the feedback signal provided to the ANDg ate 304 on line 320 changes. The output of the AND gate 304, however, is not clocked into the first D flip-flop 306 until the beginning of the next delayed clock signal Cx$_{24}$. Thus, the input signal on line 310 of the synchronizer 300 is provided a substantial time window to allow full decay or setting of a metastable state at the output of the AND gate 304. Consequently, the synchronizer 300 permits an input signal on line 310, though delayed by preceding logic stages and a potential phase difference between the receive and transmit clocks CRx, CTx, as well as the propagation and settling delay of the OR-AND latch 302, 304, to settle such that it is quite unlikely that a metastable condition will exist at the output of the AND gate 304 when the extended clock signal Cx$_{24}$ on line 133 clocks in the data present at the input of the D flip-flop 306. Further, the output of the flip-flop 306 is allowed the full period of the extended clock signal Cx$_{24}$ to settle precluding the possibility of propagating a metastable state to the output of the synchronizer circuit 300. In the immediately subsequent extended clock cycle, the data output of the D flip-flop 306 is gated into the second D flip-flop 308 and made available on its output line 312. Simultaneously, the complementary output signal provided on line 320 resets the OR-AND latch circuit 302, 304. Consequently, while introducing a delay of slightly greater than one transmitter clock cycle, the synchronizer circuit 300 effectively blocks the propagation of metastable states between its input and output.

Considering now FIG. 7, the control circuitry as shown performs a variety of functios including initializing the read and write pointers 108, 112, resetting the flag cells 242 of the cell array 200 and insuring that the overflow/underflow condition detect signal provided on line 150 is only issued when a data packet is in transit through the buffer array 110.

Subcircuit 340 of the control circuit of FIG. 7 controls the issuance of the overflow/underflow signal on line 150 depending on the data status of the memory cells 240 of the cell array 200. Two particular status conditions are of significance. The first is where all of the memory cells 240 of the cell array 200 contain logic ones corresponding, in the preferred embodiment of the present invention, to the reception of a string of more than four idle line-state symbols from the network media. The second status condition is where all of the memory cells 240 of the cell array 200 contain logic zeroes corresponding to the reception, again in the preferred embodiment, of more than four quiet line-state symbols from the network media. Both the idle and quite line-state symbols are defined in Table I and their use will be described in greater detail below. Subcircuit 340 receives the data from all the memory cells 240 of the cell array 200 on their respective data out lines 224. These data out signals and their complements are utilized by the OR circuit 342 to produce an elastic buffer idle (EBIDLE) signal on line 346 whenever all of the data output lines 224 are at a logic one and an elastic buffer quiet (EBQUIET) signal on line 348 whenever all of the data output lines 224 are at logic zero. The invert of these two signals and the cell array overflow-/underflow (O/U) signal on line 352 are combined by the AND circuit 344 such that the output signal on line 350 is a logic one whenever the data present in the memory cells 240 of the cell array 200 are not representative of either an idle or quiet line-state and an overflow/underflow condition is detected within any cell unit $200_n$. The signal on line 350 is passed through a sysnchronizer circuit $300_1$ to finally provide the overflow/underflow OvUd signal on line 50 synchronized with respect to the transmitter clock signal CTx.

Subcircuit 354 provides for the initialization of the write pointer 108 and cell array 200 as a new data packet is serially received on the DI line 136, the temporary disabling of the overflow/underflow condition detection capability of the cell units $200_n$ during initialization and the effective termination of buffer operation on receipt of either a reset signal from the node controller 14 or the occurrence of a proper overflow/underflow (OvUd) condition. In particular, the AND gate 372 receives the complement of the current serial data bit present on DI line 136, the last previously received data bit on the DIx line 215 and the EBIDLE signal from line 346 of subcircuit 340 as inputs. The AND gate 372 thus determines whether reception of a new data packet is underway by sensing the first logic zero in the serial data stream when present on the DI line 136. That is, the AND gate 372 provides a new packet start signal on line 356 upon detection of the logic zero data bit as properly present in the third serial bit position of a J starting-delimiter symbol. The new data packet start signal on line 356 is provided to the OR gate 374 along with the normally low output signals from the subcircuits 390 and 400. The true output of the OR gate 374 provides the initialize signal INITWp, INITEB on line 146. This signal is utilized to reset the counter of the writer pointer 108 and to reset all of the flag cells 242 of the cell array 200 via the OR gate 246 as shown in FIG. 5. The new data packet start signal is also provided by the inverted output of the OR gate 374 on line 362 to the OR gate 380 where it effectively resets the OR-AND latch circuit 376, 382 so as to provide the disable elastic buffer r— (DISEBR—) signal on line 214. As shown in FIG. 4, the DISEBR— signal is provided to disable the R+ and R— selector circuits 206, 208 and thereby prevent status resetting and sensing of the flag cells 242 of the cell array 200 at least until the initialization of the buffer array 110 is completed. Initialization completion is indicated by the subsequent provision of the read pointer initialize signal INITRp on line 140 to the OR gate 376. With the OR-AND latch circuit 376, 382 reset, the feedback signal on line 215 is a logic zero. Thus, the INITRp signal on line 140 will set the OR-AND latch circuit 376, 382 and effectively remove the DISEBR— signal from line 214.

Subcircuit 390 is provided to provide a delayed reset signal to the OR gate 372 of subcircuit 354. This delayed reset signal is generated in response to a reset signal RS on line $22_5$ as provided by the node controller 14. The D flip-flop 392 clocks in the state of thereset line $22_5$ in response to the receiver clock signal provided on line 132 thereto. The inverted output of the D flip-flop 392 is provided on line 402 to the OR gate 394, having as its other input the state of the reset signal on line $22_5$, which delays the application of the reset signal via line 358 until after the reset signal is relinquished. The delayed reset signal is then applied by the OR gate 394 for the remaining portion of the current receiver clock period to the OR gate 374 of subcircuit 354. Since the reset signal is provided by line $22_5$ as an additional input to the OR gate 380 of subcircuit 354, the DISEBR— signal on line 214 is asserted directly in response to the reset signal on line $22_5$. However, application of the reset is effectively maintained by the operation of the subcircuit 390 until the conclusion of the current receiver clock cycle regardless of the asynchronous withdrawal of the reset signal by the node controller 14.

Subcircuit 400 provides for the ultimate issuance of the DISEBR— signal on line 214 of subcircuit 354 in response to an overflow/underflow condition as asynchronously detected by any of the cell units $200_n$ of the cell array 200. The O/U signal is provided on line 352 as may be present on the line 352 as provided to the synchronization circuit $300_2$ where it is synchronized with respect to the $CRx_{24}$ clock signal. The output of the synchronization circuit $300_2$ is then provided as an input on line 404 to both the D flip-flop 398 and the AND gate 396. The D flip-flop 398 provides its inverted output on line 406 as the second input to the AND gate 396. Thus, the otherwise asynchronous occurrence of the O/U signal on line 352 is synchronized with respect to the receiver clock signal CRx as provided to the D flip-flop 398 on line 80. As synchronized, the overflow-/underflow detection signal is provided to the OR gate 374 via its input line 360.

Finally, subcircuit 410 functions to delay the initialization of the read pointer 112 for a period sufficient to allow the write pointer 108 to direct the writing of the minimum required number of serial data bits necessary to provide the desired elasticity in the buffer array 110. That is, the INITEB signal on line 146 occurring in response to the initial detection of a new data packet is provided to the synchronization circuit $300_3$ where it is synchronized at least with respect to the extended transmitter clock signal $CTx_{24}$. The output of the synchronization circuit $300_3$ is further synchronized by the D flip-flop 413 and the AND gate 414, similar to the respective components of the subcircuit 400, with the transmitter clock signal CTx. The resulting signal is provided by the AND gate 414 on its output line 426 to the three serially connected D flip-flops 416, 418, 420. The output of the last D flip-flop 420 in turn provides the read pointer initialize signal INITRp on line 140 to the counter of the read pointer 112 as shown in FIG. 3. Note that the synchronization circuit $300_3$ and the D flip-flops 413, 416, 418, 420 combine to provide a total delay of six transmitter clock signal periods between the initialization of the write pointer 108 and the read pointer 112. Thus, the necessary elasticity of the buffer array 110 is established by the operation of the subcircuit 410.

An ancillary function of subcircuit 410 is performed by the set-reset flip-flop 422. This flip-flop 422 is set in response to the buffer array OvUd signal on line 150 and reset in response to the INITRp signal on line 140. The output of the flip-flop 422 provides a data state force (FRCE) on line 228 to the read selector circuit 210 of FIG. 4. The purpose of this FRCE signal is to disable the read selector 210 for the period of time following a buffer array overflow/underflow condition is detected until the initialization of the buffer array 110 is completed as signified by the occurrence of the INITRp signal on line 140. Consequently, serial data provided on the DO line 72 following an overflow/underflow condition but prior to full initialization of the buffer array 110 will be forced to a logical one corresponding to an idle line-state condition.

Figure 8:
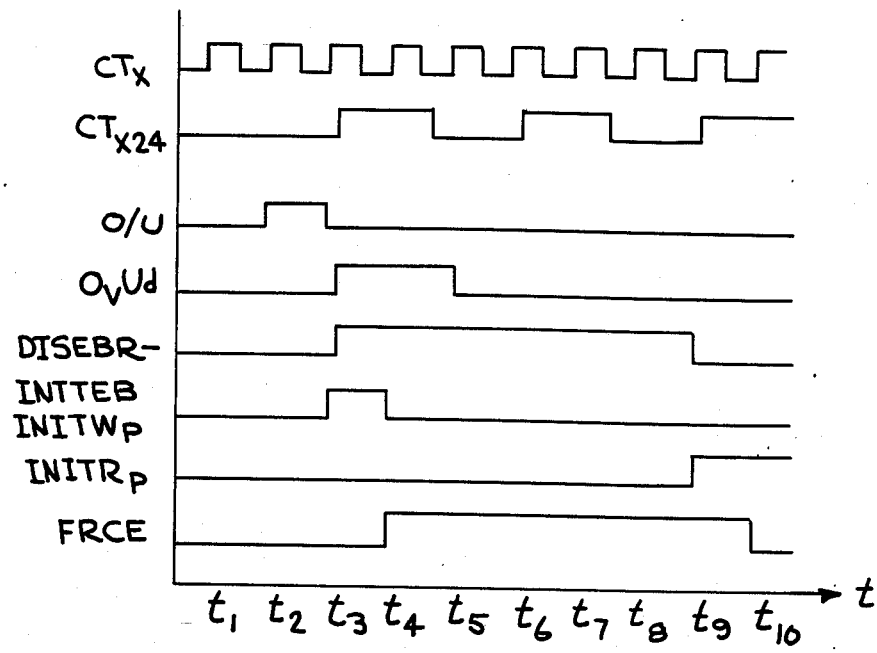
FIG. 8 is a timing diagram illustrating the overflow-/underflow condition detection and recovery provided by the control circuitry shown in FIG. 7.

The significant waveform timing relationships of the control circuits shown in FIG. 7 are illustrated in FIG. 8. As shown, the occurrence of the cell array O/U signal during transmitter clock cycles $T_1$-$T_2$ results in the occurrence of the buffer array OvUd during cycle $T_3$ synchronous with the transmitter clock signal $CTx_{24}$. The DISEBR— and INITEB/INITWp signals will also be asserted at this time. In response to the INITEB signal in particular, the INTRp signal is asserted six clock periods later, in clock period $T_9$ synchronous with the transmitter clock signal CTx. In turn, the FRCE signal, activated in clock period $T_4$ by the OvUd signal synchronous with the transmitter signal CTx, is reset at the beginning of cycle $T_{10}$ in response to the INTRp signal.

3. Clock Unit Detail

The clock unit 54, as shown in FIG. 3, may be of conventional design. Preferably, however, the clock unit 54 includes a clock phase-lock loop circuit 104 and a clock counter circuit 106. The clock phase-lock loop circuit 104 receives the system clock signal $\emptyset_{SYS}$ from line 120 and synchronously establishes a local clock signal TCLK on line 107 directly dependent on the resonant frequency of the crystal 105. Preferably the system clock signal $\emptyset_{SYS}$ is 12.5 MHz while the local clock signal TCLK is established synchronously at 125 MHz. The clock circuit 106 provides for the buffering of the local clock signal TCLK and in turn provides the transmitter clock signal CTx on its output line 80. Additionally, the clock circuit 106 provides the extended transmitter clock signal $CTx_{24}$ on its secondary output line 134. Preferably, this extended transmitter clock signal $CTx_{24}$, otherwise synchronous with the transmitter clock signal CTx, has a period of by approximately 24 nanosecondsl. While an extended clock period of approximately two to four times the transmitter clock signal period are acceptable, an extended period of 24 nanoseconds, or three CTx periods, is preferred as an easily obtainable extention and as providing the synchronization circuit 300 with a substantial margin in the prevention of metastable states.

4. ENDEC Command Management Unit Detail

Referring to FIG. 2, the command management unit (CMT) 56 preferably is a low-complexity, otherwise conventional state machine that is responsive to the serial data provided by line 72, the CMTIN signals provided on control lines $22_3$ and the bypass/loop-back control signals provided on the control lines $22_5$. In response to these inputs, the CMT unit 56 provides multiplexer control signals on lines 82 status output signals on the CMTOUT lines $22_2$ and selector control signals on the control lines 90 to the selector 64. These later control signals provide for selecting between the nominal parallel data provided on the data bus 88 and particular control symbols such as quiet, idle and halt.

Figure 9:
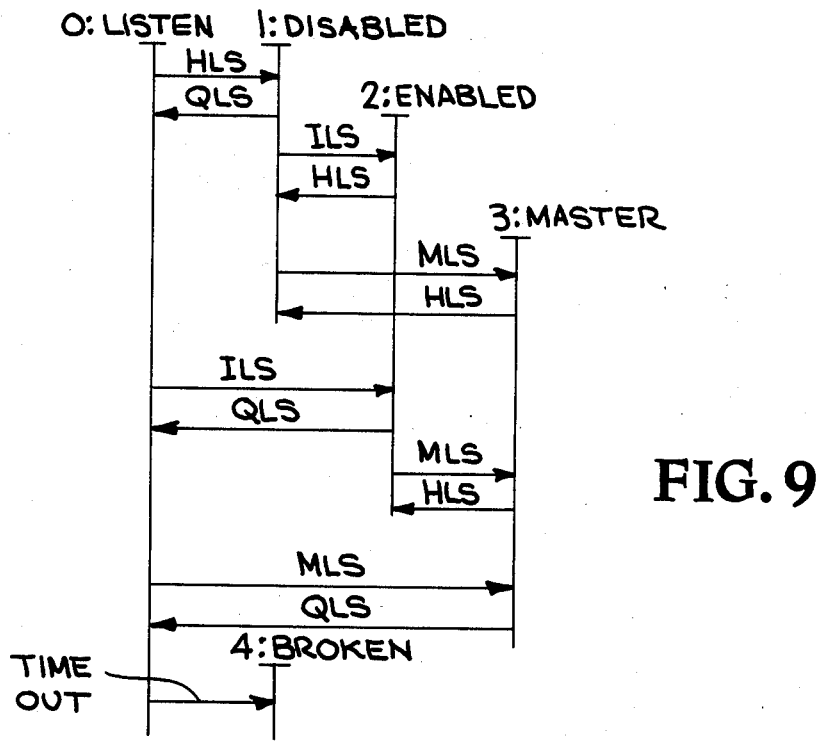
FIG. 9 is a line-state diagram of the control state function implemented in the preferred embodiment of the present invention.

The state diagram of the state machine implemented the CMT unit 56 in the preferred embodiment of the present invention as shown in FIG. 9. The CMT unit 56 is utilized to cycle the ENDEC 12 through a number of discrete states by the invocation of certain primitive protocols of the preferred local area network protocol. Upon initialization of the ENDEC 12, the CMT unit 56 is in a zero or listen state as indicated in FIG. 9. As noted above, the node controller 14 may direct the CMT unit 56 to execute the primitive protocols to become active on the local area network as a peer, master or slave unit with respect to the other nodes on the network. Thus, the CMT unit 56 receives its initial state change request from the node controller 14 via the CMTIN lines $22_3$. In response to a node controller 14 state change request that, for example, the ENDEC 12 act as a peer unit, the CMT unit 56 begins executing a primitive protocol to establish itself on the network. In response, controlling the ENDEC 12 issues a series of halt line-state symbols onto the network. At the beginning of this transmission, a dedicated timer within the CMT unit 56 is initialized to establish a maximum timeframe within which the preferred protocol stipulates that a specific reply must be received in order for the CMT unit 56 to cycle out of the current state and into its target state. Thus, the CMT unit 56 may issue a series of halt line-state symbols and, prior to the time out of the dedicated timer, begin receiving halt line-state symbols from the network. The CMT unit 56, receives any line-state symbols returned by the network via serial line 72. Reception of halt line-state symbols, results in a transition to the state one or disabled stateof operation. The CMT unit 56 will then reinitialize the dedicated timer and select idle line-state symbols for transmission onto the network. If idle line-state symbols are in turn received, then the CMT unit 56 will cycle forward the enabled state, as indicated in FIG. 9. At this point, the ENDEC 12 has succeeded in executing the primitive protocols necessary to become active as a peer node on the local area network.

The condition or state of the CMT unit 56 is preferably reported continuously to the node controller 14 via the CMTOUT control lines $22_2$. Should the CMT unit 56, at any time, detect the transmission of quiet line-state symbols over the local area network, the CMT unit 56 will immediately cycle from its current state back to the zero or listen state. With this transition, the state of the CMTOUT status lines $22_2$ will be appropriately modified.

Preferably, the CMTOUT status lines further indicate the status of the CMT unit 56 with regard to whether it has failed to obtain a proper acknowledgement of the node 10 presence on the local area network. That is, in response to the issuance of halt line-state symbols, only quiet line-state symbols were received until the time out of the dedicated CMT unit timer. As indicated in FIG. 9, these particular circumstances correspond to a transition to the broken state 4.

Also as shown in FIG. 9, the preferred CMT unit 56 state machine permits transitions from any lower state to any higher state, including the master state three. The master state three is obtained by the CMT unit 56 in response to an appropriate request from the node controller 14 on the CMTIN lines 22$_3$. Preferably, the select circuit 64 generates and selects an alternating sequence of halt and idle line-state symbols for transmission onto the network. In turn, reception of master line-state symbols, i.e., the same alternating sequence of halt and idle line-state symbols, from the network permits the CMT unit 56 to cycle forward to the master state three. Any subsequent reception of halt line symbols will cause the CMT unit 56 operating in the master state three to cycle back to its disabled state one or enabled state two. Should quiet line-state symbols be received, however, the CMT unit 56, preferably, will cycle from the master state three directly back to the listen state zero.

The preferred operation of the CMT unit 56 of the ENDEC 12 in accordance with the above description, thus operates in accordance with at least the proposed physical layer standard protocol established by the American National Standard Committee, Technical Committee X3T9.5 as of June 1, 1984 and set forth in Rev. 5 of its draft report of the same date.

IV. Summary

Thus, an ENDEC component system architecture having extensive flexible component diagnostic capabilities, a unique and optimal manner of preserving communication data packets while simultaneously establishing a smash error condition and, further, makes optimal use of a particularly preferred and synchronous elastic buffer that is optimally insensitive to metastable logic conditions has been described.

From the foregoing discussio of the many aspects of the present invention as exemplified by its preferred embodiment, it is readily apparent that many modifications and variations are possible and may be resorted to by those skilled in the art without departing from the nature and scope of the present invention. It is therefore to be understood that, within the scope of the appended claims, the invention may be practiced otherwise than is specifically described.

What is claimed is:

1. A digital code conversion system for decoding a first stream of data from an encoded data source, said code conversion system comprising:
   (a) means for detecting a particular sequence of data in said first data stream;
   (b) means for partitioning said first data stream into a plurality of data stream segments, said partitioning means being responsive to said detecting means for aligning the partitioning of said data stream segments with respect to said particular sequence of data, said partitioning means including means for providing a segment smashed signal whnever said partitioning means changes the partitioning of said data stream segments relative to the last prior occurrence of said particular sequence data of said first data stream so as to align said data stream segments with the present occurrence of said particular sequence of data; and
   (c) means for decoding said data stream segments, said decoding means being responsive to said segment smash signal so as to alter the decoding of the present occurrence of said particular sequence of data as it is decoded by said decoding means.

2. The system of claim 1 wherein said data stream segments, as decoded by said decoding means in the absence of said segment smashed signal, are of a first set of defined data stream segments.

3. The system of claim 2 wherein said particular sequence of data, as decoded by said decoding means, in the absence of said segment smashed signal is one of said first set of defined data stream segments.

4. The system of claim 3 wherein said particular sequence of data, as decoded by said decoding means in the presence of said segment smashed signal, corresponds exclusively to one of a second set of defined data stream segments.

5. The system of claim 4 further comprising:
   (a) means for receiving said first data stream; and
   (b) means for buffering said first data stream between said receiving means and said partitioning means so as to allow for a difference in the rate of transfer of said first data stream at said receiving means with respect to said partitioning means.

6. The system of claim 5 for additionally encoding a second data stream from an unencoded data source, said system further comprising:
   (a) means for encoding said second stream of data;
   (b) a first input stream selector, coupled to said encoding means, for selecting between said first data stream as decoded by said decoder means and said unencoded data source; and
   (c) a first output stream selector for selecting between said first data stream as received by said receiving means and said second data stream as encoded by said encoding means.

7. The system of claim 6 further comprising:
   (a) a second input stream selector, coupled to said receiving means for selecting between said second data stream as encoded by said encoding means and said encoded data source; and
   (b) a second output stream selector for selecting between said first data stream as decoded by said decoder means and said source of unencoded data.

8. The system of claim 7 further comprising means for cooperatively controlling said first input stream selector and said second output stream selector.

9. The system of claim 5 or 8 wherein said buffering means comprises:
   (a) means for storing data in a plurality of logically sequential data storage locations;
   (b) means for controlling the writing of data from said first data stream as received by said buffering means into said data storage means, said write control means being synchronous with the receipt of said first data stream by said receiving means; and
   (c) means for controlling the reading of said first data stream from said data storage means, said read control means being synchronous with the transfer of said first data stream to said partitioning means.

10. The system of claim 9 wherein said buffering means further comprises means for providing an error signal whenever said read control means provides for the reading of data from the one of said data storage locations, logically adjacent to the one of said data storage locations most recently written with data by said write control means and whenever said write control means provides for the writing of data to the one of said data storage locations logically adjacent to the one of said data storage locations most recently read from by said read control means.

11. The system of claim 10 wherein said data storage means further comprises means for storing a data storage location status signal for each said data storage location, said status signal being indicative of either said write control means or said rad control means as having last read or written data to a corresponding one of said data storage locations.

12. A conversion component of a local area network node wherein said component receives first and second data streams from said node and provides a third data stream to said node, said component comprising:
(a) means for routing said first and second data streams to provide said third data stream;
(b) means for diagnostically testing said component by controlling said routing means by selecting the routing of said first and second data streams to provide said third data stream; and
(c) means for converting said first and second data streams to provide a fourth data stream and for converting a fifth data stream to provide a sixth data stream, said converting means including means for synchronizing the conversion of said fifth data stream to said sixth data stream with said first and second data streams.

13. The conversion component of claim 12 wherein said diagnostically testing means includes means for routing said fourth data stream to provide said fifth data stream to allow the diagnostic testing of said converting means of said conversio component.

14. An encoder/decoder circuit for encoding and decoding data streams comprising:
(a) means for converting a first bit-serial said data stream into a first word-parallel said data stream;
(b) means for detecting a particular data bit sequence in said first bit-serial data stream corresponding to a predetermined data word;
(c) means, responsive to said detecting means, for synchronizing said converter means to the occurrence of said particular data word in said first bit-serial data stream and for maintaining the alignment of subsequent data words in said first word-parallel data stream with respect to said predetermined data word; and
(d) means for decoding said first word-parallel data stream into a first word-parallel unencoded data stream, said decoding means including means, responsive to said synchronizing means, for altering the decoding of said predetermined data word when said predetermined data word is not aligned with the preceding data word in said first word-parallel data stream, the decoding of said predetermined data word being altered so as to indicate that said converter has been re-synchronized with respect to said first bit-serial data stream.

15. An encoder/decoder integrated circuit for encoding a data stream from any one of a plurality of unencoded data sources and for decoding a data stream from any one of a plurality of encoded data sources, said circuit comprising:
(a) means for receiving a first encoded bit-serial data stream;
(b) means for buffering said first encoded bit-serial data stream;
(c) means for converting said first encoded bit-serial data stream to a first encoded word-parallel data stream;
(d) means for detecting the bit sequence of a particular data word in said first encoded bit-serial data stream;
(e) means, responsive to said detecting means, for synchronizing said converter to said first encoded bit-serial data stream so as to convert the bit sequence of said particular data word to a corresponding data word in said first encoded word-parallel data stream and for maintaining the alignment of the subsequent data words in said encoded word-parallel data stream with respect to said particular data word;
(f) means for decoding each of the data words in said first encoded word-parallel data stream so as to provide an unencoded word-parallel data stream, said decoder means, including means responsive to said detecting means, for altering the decoding of said particular data word whenever said synchronizing means changes the alignment of said particular data word with respect to its preceding data word in said first encoded word-parallel data stream so as to encode the otherwise decoded said particular data word to indicate that said converter has been re-synchronized with respect to said first encoded bit-serial data stream;
(g) means for receiving a second unencoded word-parallel data stream;
(h) means for encoding said second unencoded data stream so as to provide a second encoded word-parallel data stream; and
(i) means for serializing said second encoded word-parallel data stream to provide a second encoded bit-serial data stream.

16. A code conversion component of a local area network node for transferring data between a node controller and a network media interface, said node controller sending a first data stream to and receiving a second data stream from said conversion component, said network media interface for sending an encoded third data stream to and receiving an encoded fourth data stram from said conversion component, said conversion component comprising:
(a) encoder means for encoding a fifth data stream;
(b) decoder means for decoding a sixth data stream;
(c) first multiplexer means for selectively routing said encoded fifth data stream and said third data stream to provide said sixth data stream; and
(d) second multiplexer means for selectively routing said decoded sixth data stream and said first data stream to provide said fifth data stream.

17. The conversion component of claim 16 further comprising third multiplexer means for selectively routing said first data stream and said decoded sixth data stream to provide said second data stream.

18. The conversion component of claim 17 wherein said node controller comprises means, coupled to said first, second and third multiplexer means, for selecting either said first or said decoded sixth data stream by said second multiplexer means to provide said fourth data stream, for selecting either said third or said fourth data stream by said first multiplexer means to provide said sixth data stream and for selecting either said first or said decoded sixth data stream by said third multiplexer means to provide said fifth data stream.

19. The conversion component of claim 18 wherein said sixth data stream is subject to a fault condition and wherein said decoding means comprises:
  (a) means, responsive to said sixth data stream, for detecting said fault condition; and
  (b) means, responsive to said fault detecting means, for selectively altering the decoding of said fifth data stream upon detection of the fault condition by substituting alternate data for the data from which the fault condition was detected to indicate the detection of said fault condition to said node controller.

20. The conversion component of claim 19 wherein said fault condition includes a smash fault condition and wherein said fault detecting means includes means for detecting said smash fault condition and wherein said selectively altering means substitutes encoded data into said fifth data stream while otherwise decoding said fifth data stream as in the absence of the occurrence of any said smash fault condition, the substitute encoded date being such that, when decoded, identifies the occurrence of a smash fault condition.

21. A code conversion system for use in a local area network for converting an asynchronous stream of data between first and second sets of data codes, said data asynchronous stream being subject to a data fault condition, said system comprising:
  (a) means for detecting the occurrence of said fault condition;
  (b) means for code converting the data of said asynchronous data stream from said first set of data codes to said second set of data codes; and
  (c) means, responsive to said detecting means, for selectively altering the code conversion performed by said converting means to convert a data code of said first set of data codes to an alternate data code of said second set of data codes to reflect the occurrence of said fault condition in said asynchronous data stream.

22. The system of claim 21 wherein said detecting means detects the occurrence of said fault condition from said asynchronous data stream at the data location of its occurrence within said asynchronous data stream and wherein said selectively altering means alters the code conversion of said asynchronous data stream at the data location of said fault condition.

23. The system of claim 22 wherein said asynchronous data stream includes a plurality of asynchronous data segments, wherein said code converting means nominally converts a predetermined data segment from a first data code of said first set of codes to a first data code of said second set of codes, and wherein said selectively altering means causes said code converting means to encode said predetermined data segment from said first data code of said first set of codes to a second data code of said second set of codes.

24. The system of claim 33 wherein said data asynchronous segments occur consecutively, nominally non-overlapping in said asynchronous data stream and wherein said detecting means detects said fault condition on detecting the occurrence of said predetermined data segment prior to the expected end of the consecutive prior data segment.

25. The system of claim 24 wherein said detecting means further detects for each occurrence of said predetermined data segment and wherein said code converting means is responsive to said detecting means for synchronizing said code converting means with the subsequent occurrence of said asynchronous data segments in said asynchronous data stream.

* * * * *